(No Model.)

J. H. IRWIN & T. P. APPLE.
NOISE DEADENER FOR MILK AND OTHER CANS.

No. 295,495. Patented Mar. 18, 1884.

WITNESSES:
Clarence Wenger.
W. F. Kircher

INVENTORS:
John H. Irwin.
Theo. P. Apple.
by John A. Wiedersheim
atty.

UNITED STATES PATENT OFFICE.

JOHN H. IRWIN, OF BURLINGTON, NEW JERSEY, AND THEODORE P. APPLE, OF WEST CHESTER, PENNSYLVANIA.

NOISE-DEADENER FOR MILK AND OTHER CANS.

SPECIFICATION forming part of Letters Patent No. 295,495, dated March 18, 1884.

Application filed March 26, 1883. (No model.)

*To all whom it may concern:*

Be it known that we, JOHN H. IRWIN, of Burlington, in the county of Burlington, State of New Jersey, and THEODORE P. APPLE, of West Chester, in the county of Chester, State of Pennsylvania, both citizens of the United States, have invented a new and useful Improvement in Noise-Deadeners for Milk and other Cans, which improvement is fully set forth in the following specification and accompanying drawings, in which—

Figure 1:
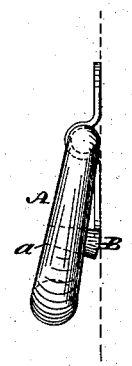
Figure 2:
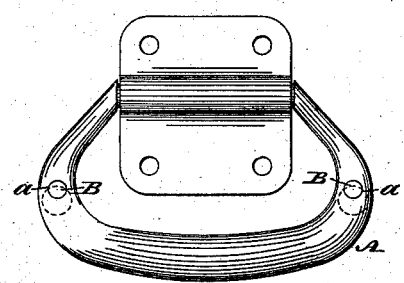

Figure 1 is an end elevation of a can-handle embodying our invention. Fig. 2 is a side elevation thereof.

Similar letters of reference indicate corresponding parts in the two figures.

Our invention consists of means, as will be hereinafter set forth and claimed, for preventing the noise incident to the dropping of the handles of cans on the sides thereof. For this purpose we employ elastic or flexible stops, which are interposed between the handles and cans, and receive the blows of the handles, thus obviating the usual noise without interfering with the freedom of operation of the handles.

Referring to the drawings, A represents the handle of a can of well-known form. In the side bars or parts of the handle are openings $a$, through which, from the rear, are inserted plugs or buffers B, of soft rubber, said openings and buffers being of tapering form, the widest part being adjacent to the side of the can, so that the buffers readily retain their position, and are tightened by use. It will be seen that when the handles are let go the buffers strike the sides of the can, and thus receive the blows incident to the dropping of the handles, whereby the rattling and general noises heretofore occasioned are avoided, and the handle and can are also protected from the shock and injurious action of the direct impact of one on the other.

It will be seen that the buffers or plugs B, owing to their tapering form and location, are retained in position without fastenings other than the walls of the openings $a$, and their adaptability to be tightened by impact with the can when the handles drop, it also being seen that the broadest end of the buffer is presented for striking the can, said part being the strongest and most durable. The openings $a$ extend entirely through the handle, so that when the buffers are worn out, having been tightened in said openings by constantly dropping against the can, they may be easily driven out by an implement inserted through the outside or narrow ends of the opening, the narrow ends of the buffer being exposed. Another advantage of the construction is that the buffers are permitted to spread through the openings without gathering or buckling, as would be occasioned were the openings limited by an end wall.

It is evident that we may employ one or more buffers for each handle; but it is desirable to locate the same so as not to interfere with the proper grasping of the handle.

Having thus described our invention, what we claim as new, and desire to secure by Letters Patent, is—

A can-handle having a tapering opening, $a$, in combination with the rubber plug B, of tapering form, said opening $a$ extending entirely through the handle and exposing the narrow end of said plug, substantially as and for the purpose set forth.

JOHN H. IRWIN.
THEO. P. APPLE.

Witnesses:
JOHN A. WIEDERSHEIM,
A. P. GRANT.